UNITED STATES PATENT OFFICE.

FRIEDRICH KOHLHAAS, OF DUSSELDORF, GERMANY, ASSIGNOR TO INTERNATIONAL STEEL, LIMITED, OF BIRMINGHAM, ENGLAND.

UNMAGNETIZABLE STEEL.

13,440. Specification of Reissued Letters Patent. Reissued July 9, 1912.

No Drawing. Original No. 981,575, dated January 10, 1911, Serial No. 592,341. Application for reissue filed February 24, 1912. Serial No. 679,799.

*To all whom it may concern:*

Be it known that I, FRIEDRICH KOHLHAAS, a subject of the Emperor of Germany, residing at Dusseldorf, Germany, have invented a new and useful Improvement in Unmagnetizable Steel, of which the following is a specification.

Steel having a content of from 10% on of manganese enjoys but a very small degree of magnetic permeability it takes on magnetism only with extraordinary difficulty and only in extraordinarily small quantities, being practically unmagnetizable. The high content of manganese, however makes this steel so hard as to prevent its being worked. Besides this, the high content of manganese conduces to the limit of elasticity, being situated pretty near the breaking point, so that the toughness is of too low a nature. Unmagnetizable steel, having a high percentage of manganese, which, at the same time, is better able to be worked, while possessing a greater degree of toughness, has been successfully produced by adding to the steel an admixture of titanium. The product obtained by this means allows of being treated comparatively well; its qualities of density are, further, favorable, inasmuch as the limit of elasticity, in spite of much higher tensibility, constitutes about 47% of its breaking strength. So this new material is very tough. In spite of this, the magnetic permeability that is, the possibility of assimilating magnetism or of being magnetizable is not so great as is the case with regard to pure nickel and cobalt. Their favorable conditions allow of a more extended utilization of the steel for the various purposes for which unmagnetizable or un-magnetic material has to be used, such as, *e. g.* in shipbuilding, for electric measuring instruments, for the armament of electric cables and so on.

The new manganese steel when the whole charge is in a fluid state contains the following constituents approximately 9.8–10.3% manganese, 0.9–% carbon, 0.2–1.4% titanium, maximum 0.8% silicon maximum 0.03% sulfur, maximum 0.015% phosphorus. These are found to be suitable limits for the manganese, carbon and titanium, and will usually be found substantially in the finished steel, but it must be pointed out that the eventual content of titanium will vary considerably according to duration, temperature and other conditions of working, the essential requirement being that a substantial amount of titanium shall be employed in combination with such a large percentage of manganese as will produce what is well known as manganese steel—*i. e.*, a steel containing at least 8 per cent. of manganese.

The steel can be produced both in crucible furnaces and in oxidizing Martin furnaces, whereby, ordinarily soft low-carbon i. got-iron and ferro manganese containing 80–85% of manganese are employed.

I claim:—

1. Unmagnetizable steel containing about 9.8–10.3% manganese, about 0.9–1% carbon, about 0.2–1.4% titanium, maximum 0.8% silicon, maximum 0.03% sulfur and maximum 0.015% phosphorus.

2. A non-magnetizable manganese steel containing titanium.

3. As a new article of manufacture a non-magnetizable manganese steel composition containing a relatively high percentage of manganese, and titanium with carbon and silicon.

FRIEDRICH KOHLHAAS.

Witnesses:
R. KRANZ,
P. GRUBEN.